(12) United States Patent
Kile

(10) Patent No.: US 8,596,374 B2
(45) Date of Patent: Dec. 3, 2013

(54) GROUND WORKING APPARATUS

(76) Inventor: Ronald J. Kile, Rosalia, WA (US)

( * ) Notice: Subject to any disclaimer, the term of this patent is extended or adjusted under 35 U.S.C. 154(b) by 312 days.

(21) Appl. No.: 12/982,518

(22) Filed: Dec. 30, 2010

(65) Prior Publication Data

US 2012/0168186 A1    Jul. 5, 2012

(51) Int. Cl.
*A01B 15/00*        (2006.01)

(52) U.S. Cl.
USPC .......................................... 172/389; 172/265

(58) Field of Classification Search
USPC ................. 172/265, 389, 390, 392, 705, 727
See application file for complete search history.

(56) References Cited

U.S. PATENT DOCUMENTS

| | | | | |
|---|---|---|---|---|
| 190,606 | A | * | 5/1877 | McDill ........................ 172/392 |
| 292,283 | A | * | 1/1884 | Christian et al. ............. 172/392 |
| 357,377 | A | * | 2/1887 | Everingham .................. 172/142 |
| 932,785 | A | * | 8/1909 | King .............................. 172/392 |
| 2,328,174 | A | * | 8/1943 | Silver ............................ 111/59 |
| 2,401,139 | A | * | 5/1946 | Cook ............................. 172/683 |
| 2,618,081 | A | * | 11/1952 | Sinner et al. ................... 37/366 |
| 2,829,578 | A | * | 4/1958 | Brown ........................... 172/170 |
| 3,084,749 | A | | 4/1963 | Anderson |
| 3,098,529 | A | | 7/1963 | Wade et al. |
| 3,189,102 | A | | 6/1965 | Brown |
| 3,321,027 | A | * | 5/1967 | Johnson et al. ............ 172/260.5 |
| 3,493,055 | A | | 2/1970 | Peursem |
| 3,708,019 | A | * | 1/1973 | Ryan ............................. 172/470 |
| 3,963,079 | A | * | 6/1976 | Carlucci ....................... 172/200 |
| 4,083,131 | A | * | 4/1978 | Auer ............................... 37/219 |
| 4,128,130 | A | * | 12/1978 | Green et al. ................... 172/266 |
| 4,177,865 | A | | 12/1979 | Lewison |
| 4,185,699 | A | | 1/1980 | Lewison |
| 4,200,157 | A | | 4/1980 | Anderson |
| 4,407,207 | A | * | 10/1983 | Dreyer ........................... 111/136 |
| 4,463,813 | A | | 8/1984 | Long et al. |
| 4,548,277 | A | | 10/1985 | Dietrich, Sr. et al. |
| 4,580,507 | A | * | 4/1986 | Dreyer et al. ................... 111/73 |
| 4,699,221 | A | | 10/1987 | Malinowski et al. |
| 4,700,785 | A | * | 10/1987 | Bartusek et al. ............... 172/705 |
| 4,730,678 | A | | 3/1988 | Denis et al. |
| 4,759,301 | A | | 7/1988 | Thomas |
| 5,152,349 | A | * | 10/1992 | Roden ........................... 172/177 |
| 5,427,183 | A | | 6/1995 | Parker |
| 5,544,709 | A | * | 8/1996 | Lowe et al. ................... 172/661 |
| 5,676,211 | A | * | 10/1997 | Noonan et al. ................ 172/512 |
| 5,787,992 | A | | 8/1998 | Dobson et al. |
| 6,564,728 | B2 | | 5/2003 | Ryan et al. |
| 7,395,767 | B2 | * | 7/2008 | Sulman ........................... 111/55 |

\* cited by examiner

*Primary Examiner* — Thomas B Will
*Assistant Examiner* — Joel F. Mitchell
(74) *Attorney, Agent, or Firm* — Parsons & Goltry; Michael W. Goltry; Robert A. Parsons

(57) ABSTRACT

A ground working apparatus has a plow assembly including a frame formed with an attached runner and a plow tool. A linkage assembly couples the frame to a bridle assembly for movement of the plow assembly between raised and lowered positions relative to the bridle assembly. The runner and the plow tool depend downwardly from the frame to concurrently run over and plow, respectively, ground to be plowed along a plowing path ahead of the bridle assembly and the plow assembly, wherein the runner sets the frame of the plow assembly at a fixed elevated position with respect to the ground to be plow.

19 Claims, 9 Drawing Sheets

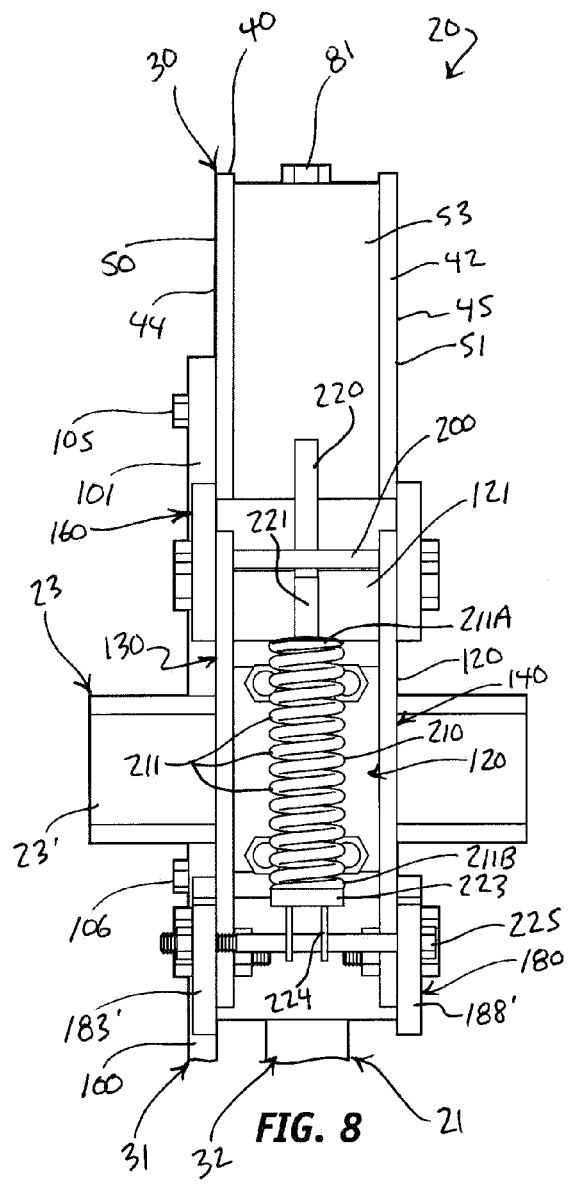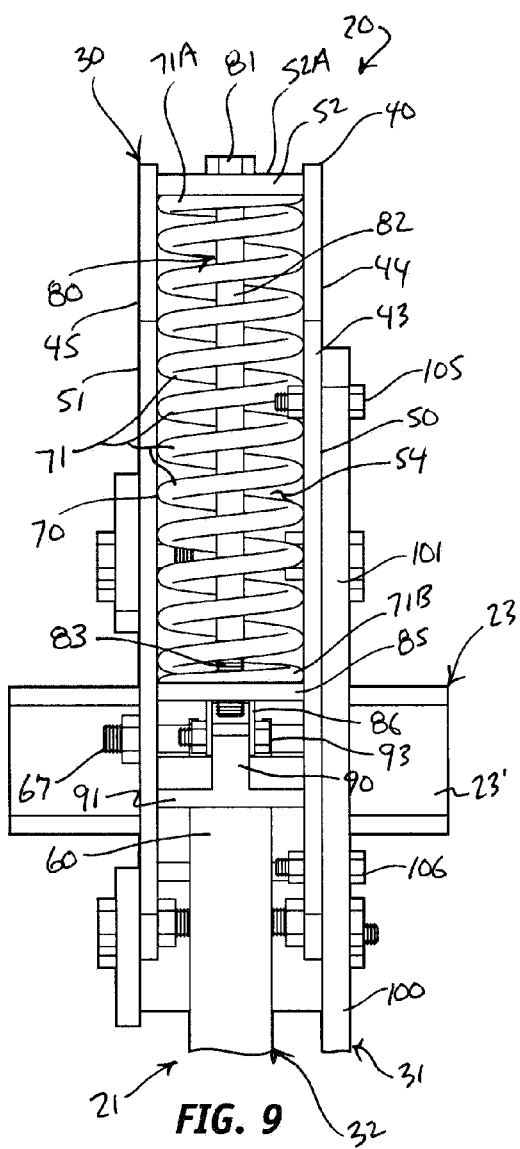

GROUND WORKING APPARATUS

FIELD OF THE INVENTION

The present invention relates to an agricultural implements used to plow soil for cultivating purposes.

BACKGROUND OF THE INVENTION

Modern cultivating tool shanks routinely incorporate automatic plow shank reset features utilizing springs to apply an initial preset force resisting movement of the shank upwardly from the plowing or field working position. The preset force is generated through a predetermined preload on the reset spring. Once the preset force is overcome, such as when the plow shank encounters a bolder or other rigid object, the plow shank displaces upwardly to clear the obstruction compressing the spring. After the obstruction is cleared, the spring decompresses forcing the plow shank downwardly back to the plowing or field working position.

The upward displacement of the plow shank is commonly referred to as tripping, and the horizontal force required to induce tripping is commonly referred to as the trip force. Although conventional automatic shank reset features are beneficial, the plow shank ultimately takes the full brunt of the trip force, which, notwithstanding plow shank displacement, often damages the plow shank, which leads to costly and time-consuming repairs. Furthermore, automatic shank reset features in prior art plow shanks routinely maintain an irregular or unpredictable plow depth, particular in hard and dense soil conditions, which often requires multiple plowing operations to produce the desired soil preparation.

SUMMARY OF THE INVENTION

According to the principle of the invention a ground working apparatus includes a bridle assembly to secure a plow frame, and a plow assembly. The plow assembly includes a frame, and a runner and a plow tool each coupled to the frame. A linkage assembly couples the frame to the bridle assembly to secure a plow frame for movement of the plow assembly between raised and lowered positions relative to the bridle assembly. The runner and the plow tool depend downwardly from the frame to concurrently run over and plow, respectively, ground to be plowed along a plowing path ahead of the bridle assembly and the plow assembly, and the runner to run over the ground to be plowed to set the frame of the plow assembly at a fixed elevated position with respect to the ground to be plow. A bridle spring is coupled between the bridle assembly and the linkage assembly, which applies a bias to the linkage assembly urging the plow assembly toward the raised position away from the lowered position. The plow tool is mounted to the frame for movement between a lowered plowing position and an elevated clearance position, and a plow spring is coupled between the frame and the plow tool urging the plow tool in a direction toward the lowered plowing position. The runner is positioned between the plow tool and the bridle assembly. In particular, the plow tool consists of an elongate shank coupled to the frame and which depends downwardly therefrom to an attached tilling head assembly to extend into and plow the ground to be plowed in the lowered plowing position of the plow tool. The runner includes an elongate, rigid support having an upper end coupled to the frame and which depends downwardly therefrom to an opposed lower end formed with a ground-engaging skid set forwardly of and above the tilling head assembly to support the frame at an elevated position relative to the ground to be plowed by the tilling head assembly. The linkage assembly is a four-bar linkage pivotally coupled between the frame and the bridle assembly.

According to the principle of the invention, a ground working apparatus includes a bridle assembly to secure a plow frame, and a plow assembly. The plow assembly includes a frame, and a runner and a plow tool each coupled to the frame. A linkage assembly is pivotally coupled between the frame and the bridle assembly permitting movement of the plow assembly between raised and lowered positions relative to the bridle assembly. The runner and the plow tool depend downwardly from the frame to concurrently run over and plow, respectively, ground to be plowed along a plowing path ahead of the bridle assembly and the plow assembly, and the runner to run over the ground to be plowed to set the frame of the plow assembly at a fixed elevated position with respect to the ground to be plow. The linkage assembly consists of generally horizontal upper and lower links pivoted to the frame and the bridle at frame and bridle pivot points, respectively. An extension of the lower link extends forwardly of the bridle pivot point of the lower link away from the plow assembly, and a bridle spring is coupled between the bridle assembly and the extension of the lower link applying a bias to the lower link urging the plow assembly toward the raised position away from the lowered position. The plow tool is mounted to the frame for movement between a lowered plowing position and an elevated clearance position, and a plow spring is coupled between the frame and the plow tool urging the plow tool in a direction toward the lowered plowing position. The bridle spring has an upper end pivoted to the bridle assembly, and an opposed lower end pivoted to the extension of the lower link. The runner is positioned between the plow tool and the bridle assembly. In particular, the plow tool includes an elongate shank coupled to the frame and which depends downwardly therefrom to an attached tilling head assembly to extend into and plow the ground to be plowed in the lowered plowing position of the plow tool. The runner consists of an elongate, rigid support having an upper end coupled to the frame and which depends downwardly therefrom to an opposed lower end formed with a ground-engaging skid set forwardly of and above the tilling head assembly to support the frame at an elevated position relative to the ground to be plowed by the tilling head assembly.

According to the principle of the invention, a ground working apparatus includes a bridle assembly to secure a plow frame, and a plow assembly. The plow assembly includes a frame, and a runner and a plow tool each coupled to the frame. A linkage assembly is pivotally coupled between the frame and the bridle assembly permitting the plow assembly to displace between raised and lowered positions relative to the bridle assembly. The runner and the plow tool depend downwardly from the frame to concurrently run over and plow, respectively, ground to be plowed along a plowing path ahead of the bridle assembly and the plow assembly, and the runner to run over the ground to be plowed to set the frame of the plow assembly at a fixed elevated position with respect to the ground to be plow. The linkage assembly consists of generally horizontal upper and lower links pivoted to the frame and the bridle at frame and bridle pivot points, respectively, and there is an extension of the lower link extending forwardly of the bridle pivot point of the lower link away from the plow assembly. A bracket is affixed to the bridle assembly near the bridle pivot point of the upper link, and a bridle spring is coupled between the bracket and the extension of the lower link applying a bias to the lower link at the extension urging the plow assembly toward the raised position away from the lowered position and the ground to be plowed. The bridle spring has an upper end pivoted to the bracket, and an opposed lower end pivoted to the extension of the lower link. The runner is positioned between the plow tool and the bridle assembly. In particular, the plow tool includes an elongate shank coupled to the frame and which depends downwardly therefrom to an attached tilling head assembly to extend into and plow the ground to be plowed. The runner consists of an elongate, rigid support having an upper end coupled to the frame and which depends downwardly therefrom to an opposed lower end formed with a ground-engaging skid set forwardly of and above the tilling head assembly to support the frame at an elevated position relative to the ground to be plowed by the tilling head assembly. The shank is mounted to the frame for movement between a lowered plowing position of the tilling head assembly to plow the ground to be plowed and an elevated clearance position of the tilling head assembly, and a plow spring is coupled between the frame and the shank urging the plow tool in a direction toward the lowered plowing position of the tilling head assembly.

BRIEF DESCRIPTION OF THE DRAWINGS

Referring to the drawings:

FIG. 8 is an enlarged, fragmented, front elevation view of the ground working apparatus of FIG. 1 illustrating a bridle spring coupled between the bridle assembly and the linkage assembly;

FIG. 9 is an enlarged, fragmented, rear elevation view of the ground working apparatus of FIG. 1 illustrating a plow spring coupled between a frame and a plow tool of the plow assembly;

DETAILED DESCRIPTION

§A. Overview of the Ground Working Apparatus

Figure 1:
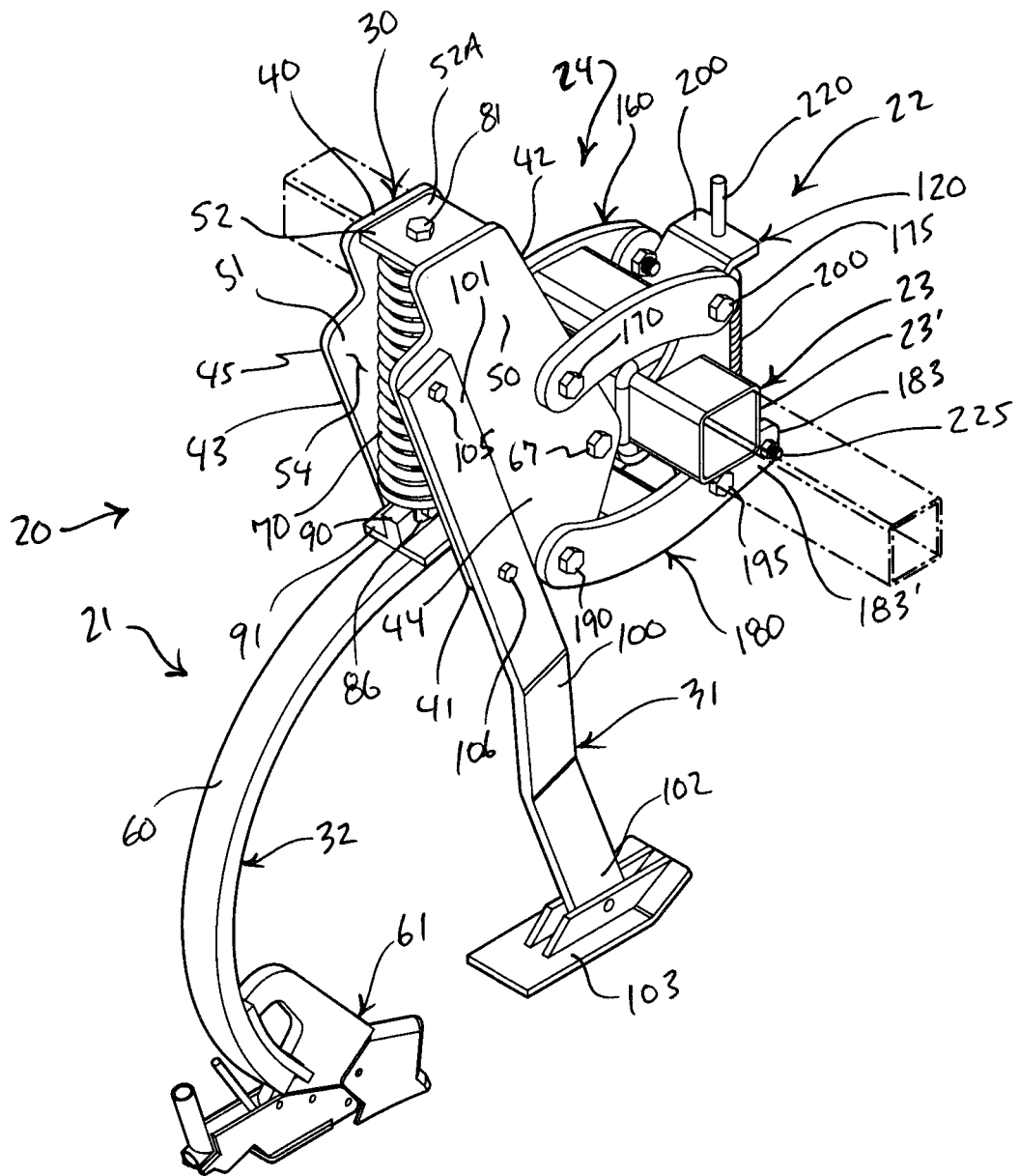
FIG. 1 is a rear perspective view of a ground working apparatus constructed and arranged in accordance with the principle of the invention, the ground working apparatus including a plow assembly, a bridle assembly to secure a plow frame, and a linkage assembly coupling the plow assembly to the bridle assembly.
Figure 2:
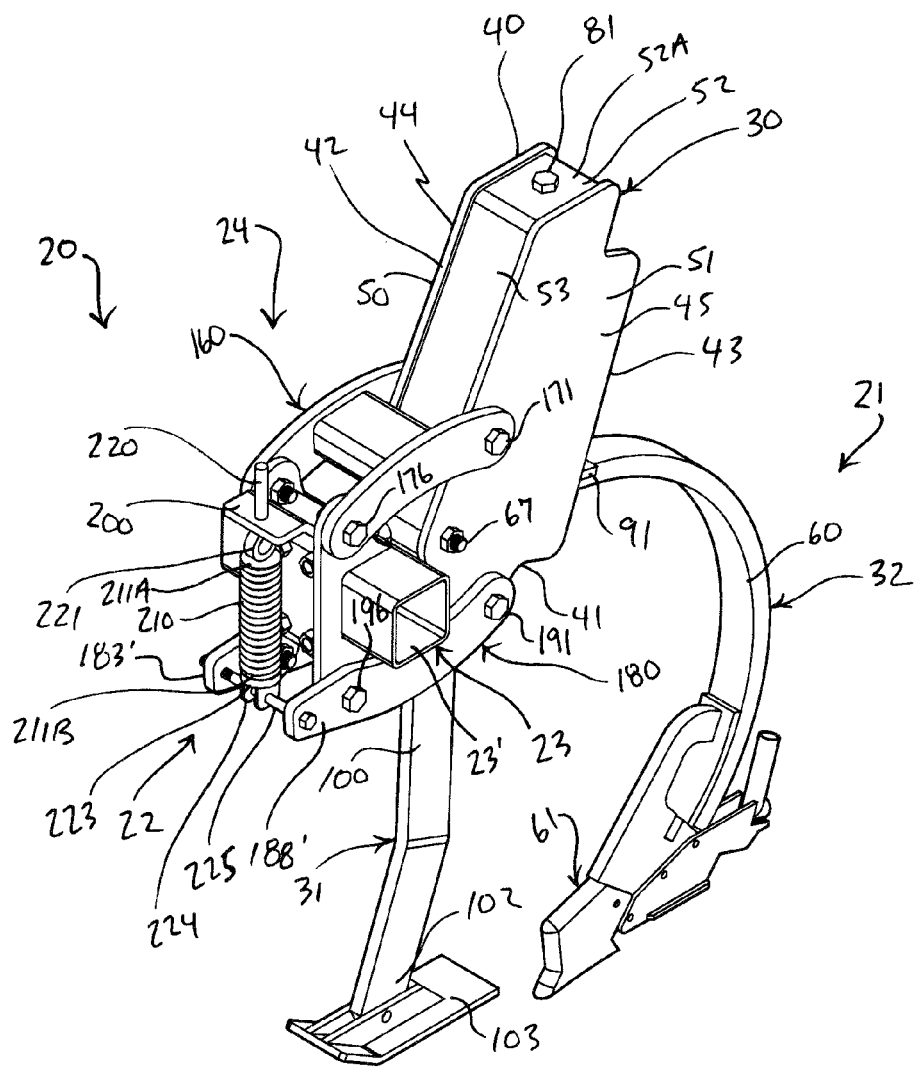
FIG. 2 is a front perspective view of the ground working apparatus of FIG. 1.

Turning now to the drawings, in which like reference characters indicate corresponding elements throughout the several views, attention is first directed to FIGS. 1 and 2 illustrating a ground working apparatus 20 constructed and arranged in accordance with the principle of the invention including a plow assembly 21, a bridle assembly 22 to secure a plow frame denoted generally at 23, and a linkage assembly 24 coupling plow assembly 21 to bridle assembly 22. Ground working apparatus 20 is stout, strong, robust, and of substantial construction being formed principally of steel or other strong, resilient metal as is common with conventional plow assemblies of the type used to plow soil for cultivating purposes. Throughout the various drawings, only a portion of plow frame 23 is shown for illustration and reference, which, for illustrative purposes, consists of a segment 23' an elongate frame member forming a part of plow frame 23.

Figure 4:
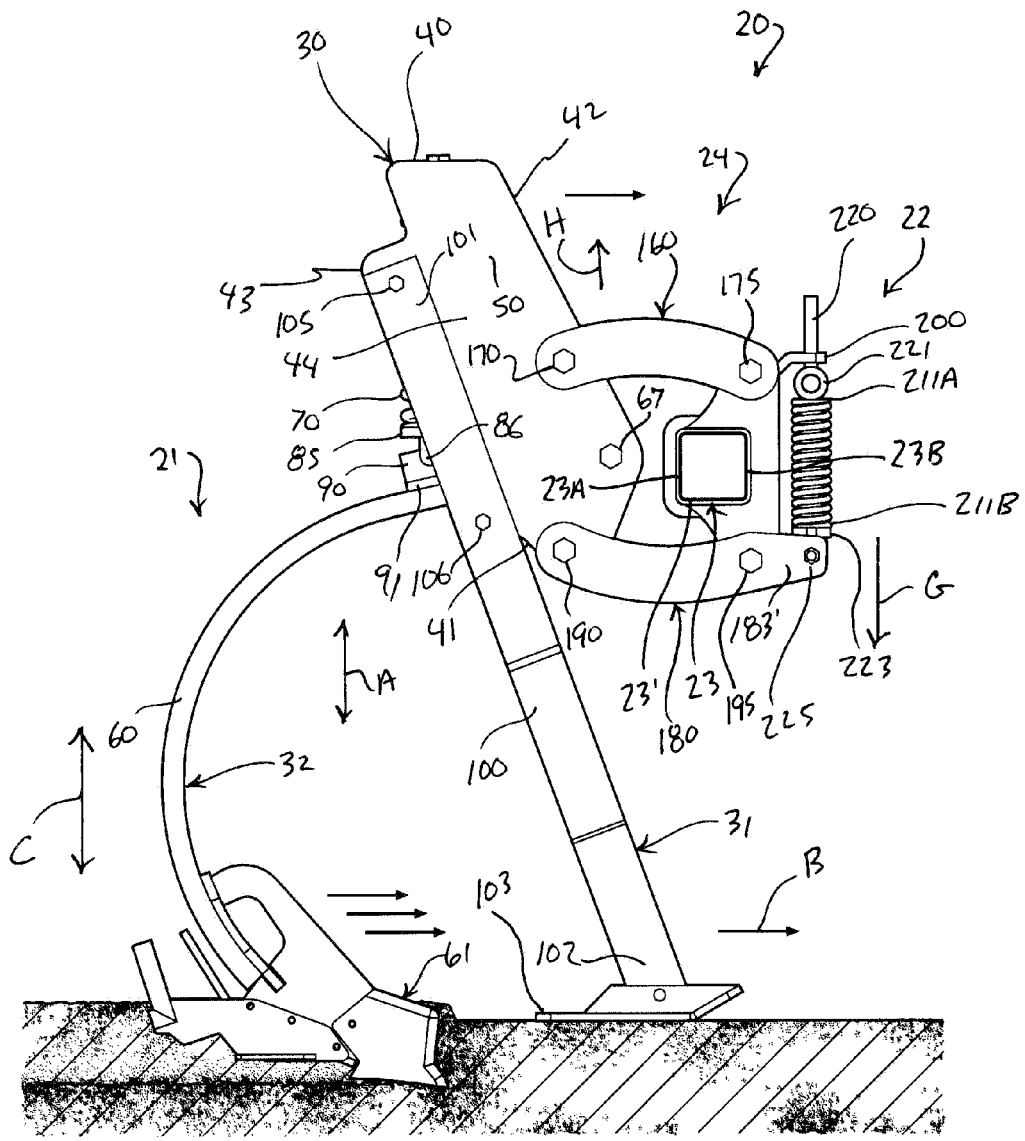
FIG. 4 is a right side elevation view of the ground working apparatus of FIG. 1.
Figure 5:
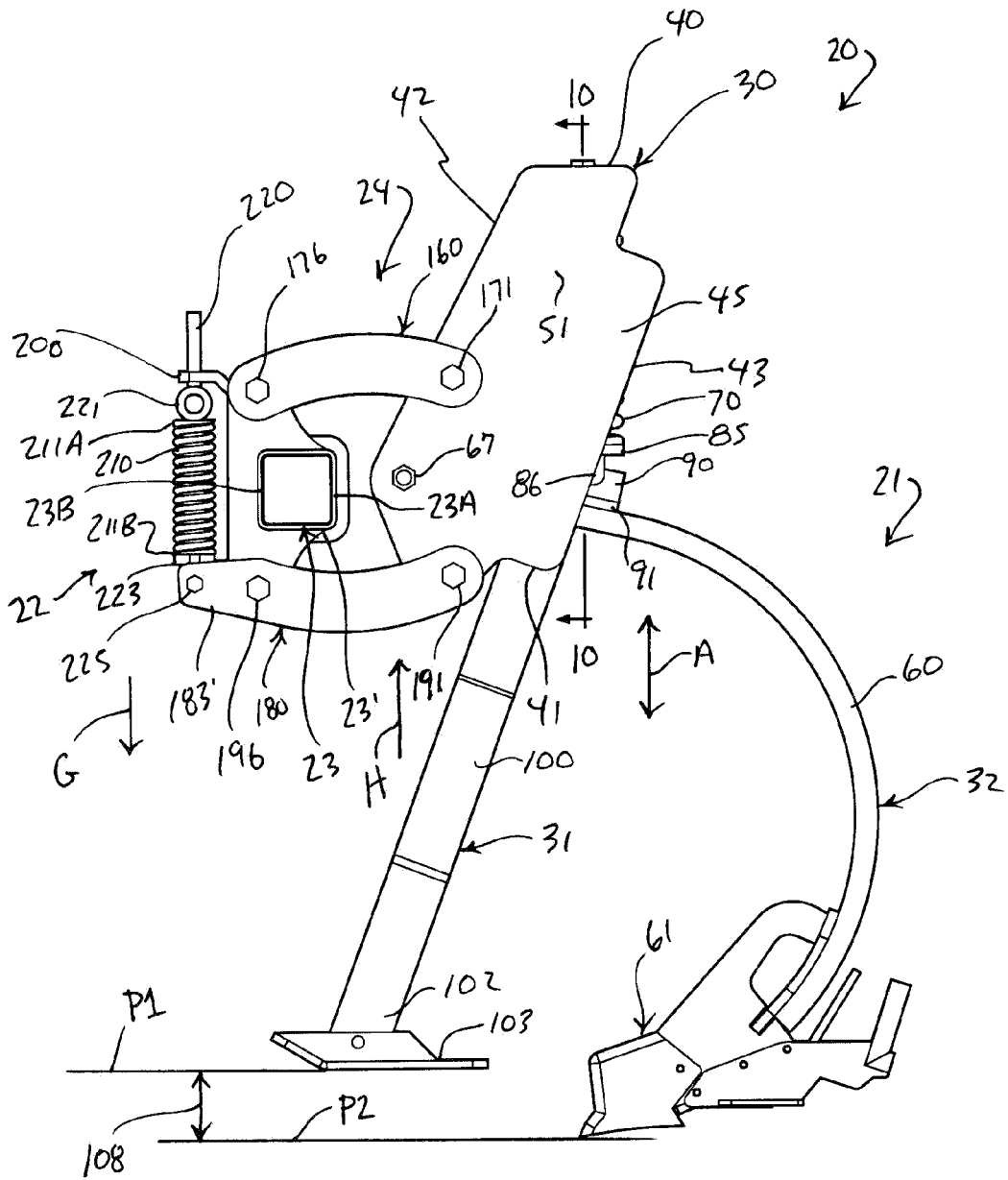
FIG. 5 is a left side elevation view of the ground working apparatus of FIG. 4.
Figure 11:
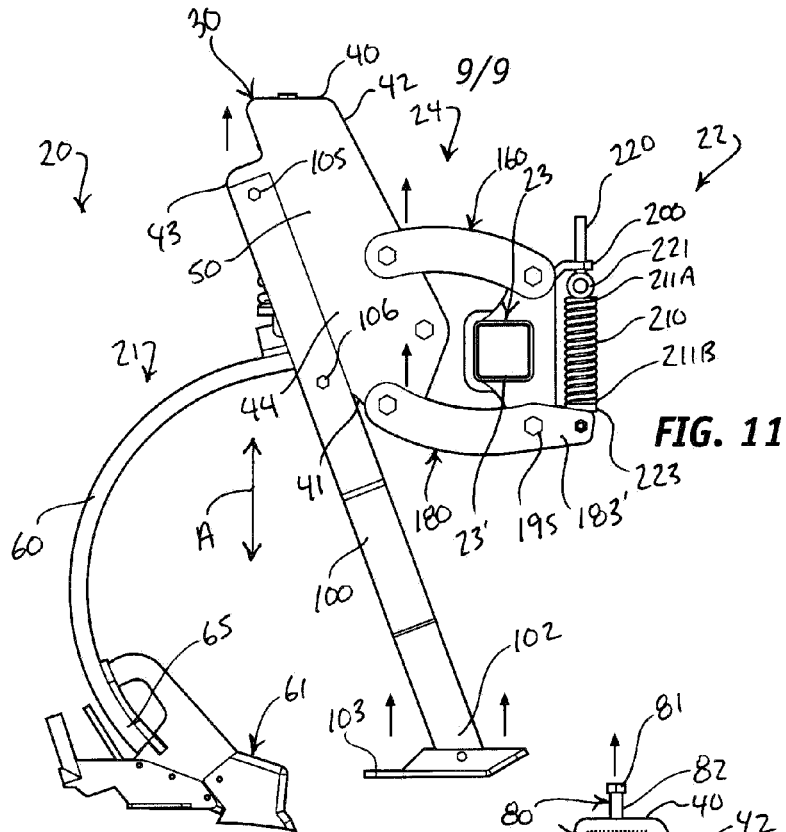
FIG. 11 is a side elevation view of the ground working apparatus of FIG. 1 illustrating the plow assembly as it would appear in a raised position relative to the bridle assembly.

Plow assembly 21 includes a frame 30, and a runner 31 and a plow tool 32 each coupled directly to frame 30. Linkage assembly 24 couples frame 30 to bridle assembly 22 to secure a plow frame 23 for movement or displacement of plow assembly 21 in reciprocal directions relative to bridle assembly 22 as generally indicated by double arrowed line A in FIGS. 4, 5 and 11 between a lowered position of plow assembly 21 with respect to bridle assembly 22 as shown in FIGS. 4 and 5, and a raised position of plow assembly with respect to bridle assembly 22 as shown in FIG. 11. Plow assembly 21 is positioned upright behind bridle assembly 22, frame 30 is set at an elevated location relative to ground to be plowed 26 illustrated in FIG. 4, and runner 31 and plow tool 32 depend downwardly from frame 30 to concurrently run over and plow, respectively, ground to be plowed 26 as illustrated in FIG. 4 along a plowing path B ahead of ground working apparatus 20. Runner 31 is positioned between plow assembly 21 and bridle assembly 22, and runner 31 runs over ground to be plowed 26 to set frame 30 of plow assembly 21 at fixed elevated position with respect to ground to be plowed 26 as ground working apparatus 20 is moved and applied along plowing path B denoted in FIG. 4 in a direction leading with bridle assembly 22 and trailing with plow assembly 21.

A bias is applied between bridle assembly 22 and linkage assembly 24 biasing linkage assembly 24 urging plow assembly 21 toward the raised position of plow assembly 21 away from the lowered position of plow assembly 21 partially taking up plow assembly 21. Plow assembly 21 has or otherwise defines a load, and the bias applied between bridle assembly 22 and linkage assembly 24 takes up some of the load of plow assembly 21 allowing plow assembly 21 to more easily displace upwardly into its raised position from its lowered position, and dampens movement of plow assembly 21 from its raised position back to its lowered position preventing plow assembly from slamming against the ground to be plowed, which could otherwise damage plow assembly 21 or compromise the linkage between plow assembly 21 and bridle assembly 22.

Figure 12:
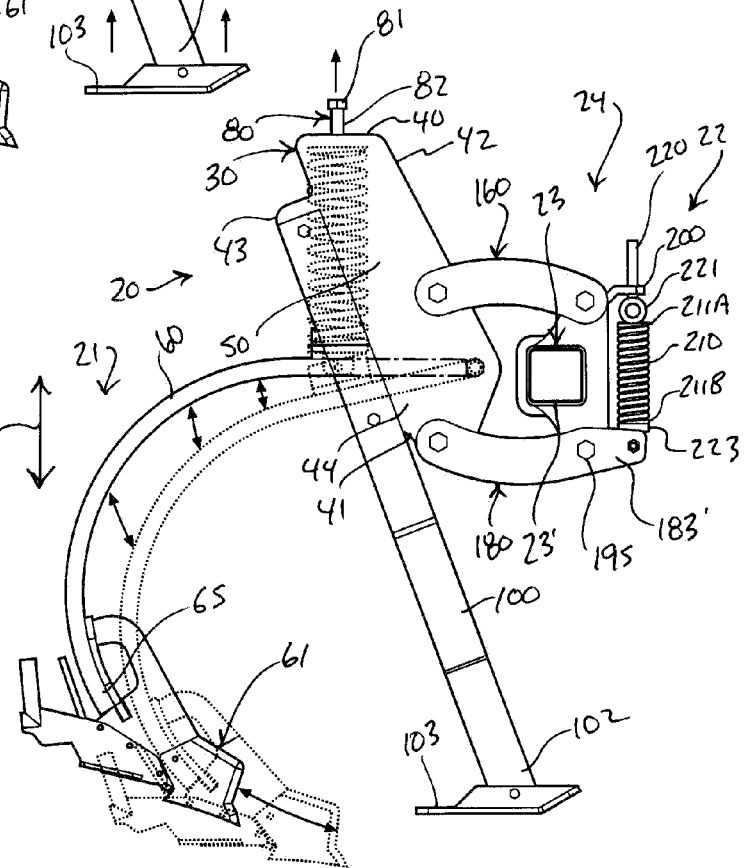
FIG. 12 is a side elevation view of the ground working apparatus of FIG. 1 illustrating a plow tool of the plow assembly as it would appear in an elevated clearance position relative to a lowered plowing position of the plow tool illustrated in phantom outline.

Plow tool 32 is, in turn, mounted to frame 30 for movement in reciprocal directions as generally indicated by the double arrowed line C in FIGS. 4 and 12 between a lowered plowing position as shown in FIG. 4 to plow ground to be plowed 26, and an elevated clearance position as shown in FIG. 12 to clear an impacting obstacle. A bias is applied between frame 30 and plow tool 32 urging plow tool 32 in a direction toward the lowered plowing position shown in FIG. 4, and which yet permits plow tool 32 to displace upwardly during a tripping event, namely, when plow tool 32 encounters an obstacle.

Ground working apparatus 20 is an exemplary agricultural implement used to plow soil for cultivating purposes. Ground working apparatus 20 is normally used with a plurality of such devices which are generally mounted in a spaced and side-by-side relationship on a plow frame of a cultivating implement, such as plow frame 23, which is drawn by a tractor.

Having presented the general aspects of ground working apparatus 20, the specific structure details of plow assembly 21, bridle assembly 22, and linkage assembly 24 are discussed throughout the remainder of this specification. It is to be understood that ground working apparatus 20 incorporates numerous conventional nut-and-bolt assemblies each including a bolt consisting of a shank or shaft having an end formed with an enlarged bolt head and an opposed externally threaded end, and an internally threaded nut that threads onto and secures the externally threaded end. The bolts of the various nut-and-bolt assemblies are conventionally installed through openings formed in the various parts of ground working apparatus 20, and are assembled with the corresponding threaded nuts to secure parts together and to provide pivoting mounts between various pivoted or pivotally attached parts of ground working apparatus 20 as will be explained in detail below. The various nut-and-bolt assemblies and the corresponding openings that receive the bolts represent conventional arrangements, the use and application of which are well-known to the skilled artisan. As such, the various nut-and-bolt assemblies are not discussed in detail and are each given a general reference numeral for reference purposes, and the various openings that receive the bolts of the corresponding nut-and-bolt assemblies are considered part of the nut-and-bolt assemblies and are thus also referenced by the reference numerals denoting the various nut-and-bolt assemblies. As such, when a nut-and-bolt assembly is applied to a structural element, the bolt is received by an opening in the structural element and is secured between the bolt head and the threaded nut. Furthermore, when a nut-and-bolt assembly is applied to structural elements, the bolt is received by corresponding openings in the structural elements, which are secured between the bolt head located on one side of one of the structural elements and the threaded nut located on an opposing side of the opposed structural element.

Throughout the ensuing specification nut-and-bolt assemblies are incorporated as various pivotal mounts. Those having regard for the art will readily appreciate that pivot pins and other forms of pivot mounts may be used without departing from the invention. Furthermore, at various points throughout this specification terms such as "substantially," "generally," and "approximately" are used to describe characteristics. Those having regard for the art will readily appreciate that when such terms are used to describe a characteristic, the described characteristic is more present than not.

§B. The Plow Assembly

Plow assembly 21 consists of frame 30, and runner 31 and plow tool 32 each coupled directly to frame 30. Referencing FIGS. 1-3, frame 30 includes opposed upper and lower ends 40 and 41, opposed front and rear ends 42 and 43, and opposed sides 44 and 45. Sides 44 and 45 are defined by opposed side plates 50 and 51 extending between upper and lower ends 40 and 41, and opposed front and rear ends 42 and 43. Upper end 40 is closed by a top plate 52, and front end 42 is closed by a front plate 53, both of which extend between side plates 50 and 51. Side plates 50 and 51 are open at lower end 41 and rear end 43 of frame 30, and lead to an interior space or chamber 54 defined by and between side plates 50 and 51, top plate 52, and front plate 53. Side plates 50 and 51 and top and front plates 52 and 53 are preferably welded together.

Plow tool 32 is an assembly of substantial construction consisting of a tough, resilient shank 60 and an attached tilling head or tilling head assembly 61 designed to plow or till ground to be plowed 26 as shown in FIG. 4. Looking to FIG. 3, shank 60 is elongate and arcuate and has an inner or proximal end 64 and an opposed outer or distal end 65. Proximal end 64 extends into chamber 54 through rear end 43 of frame 30 and is coupled to frame 30 near or otherwise proximate to front end 42 of frame 30 between upper and lower ends 40 and 41 of frame 30. Shank 60 extends rearwardly from proximal end 64 through rear end 43 of frame 30, and further extends rearwardly of rear end 43 of frame 30 and curves and depends downwardly from frame 30 and then curves inwardly toward rear end 43 of frame 30 to distal end 65 formed with a conventionally-formed tilling head assembly 61, which is located downwardly of or otherwise below frame 30 to extend into and plow ground to be plowed in the lowered plowing position of plow tool 32.

As mentioned above, plow tool 32 is mounted to frame 30 for movement in reciprocal directions as generally indicated by the double arrowed line C in FIGS. 4 and 12 between a lowered plowing position as shown in FIG. 4 to extend into and plow ground to be plowed 26, and an elevated clearance position as shown in FIG. 12 to clear an impacting obstacle. In particular, and with continuing reference to FIG. 3, proximal end of shank 60 is mounted to frame 30 for pivotal movement with a nut-and-bolt assembly 67 between the lowered plowing position of plow tool 32 consisting of a lowered plowing position of tilling head assembly 61 to extend into and plow ground to be plowed 26 as shown in FIG. 4, and the elevated clearance position of plow tool 32 consisting of an elevated clearance position of tilling head assembly 61 as shown in FIG. 12, and a plow spring 70 is coupled between frame 30 and shank 60 of plow tool 32, which applies the bias between frame 30 and shank 60 of plow tool 32 urging plow tool 32 in the direction toward the lowered plowing position of plow tool 32 consisting of the lowered plowing position of tilling head assembly 61 as shown in FIG. 4. Nut-and-bolt assembly 67 is applied to side plates 50 and 51 of frame near front end 42 of frame 30 between upper and lower ends 40 and 41 of frame 30. Proximal end 64 of shank 60 is bifurcated and encircles and is free to pivot about the bolt of nut-and-bolt assembly 67 that extends through chamber 54 between side plates 50 and 51 to permit shank 60 to pivot at proximal end 64 between the lowered plowing position of tilling head assembly 61 and the elevated clearance position of tilling head assembly 61.

Plow spring 70 is applied between frame 30 and shank 60 and acts between and against frame 30 and shank 60 urging plow tool 32 toward the lowered plowing position of tilling head assembly 61. Plow spring 70 is a conventional aggressive tension spring that provides an outwardly bias and consists of a wire formed into numerous active coils 71 including two, opposed outermost coils 71A and 71B. Plow spring 70 is fashioned of spring steel, a nickel-based spring alloy, or other material or combination of materials having a substantially constant moduli of elasticity as is typical with tension springs.

Figure 10:
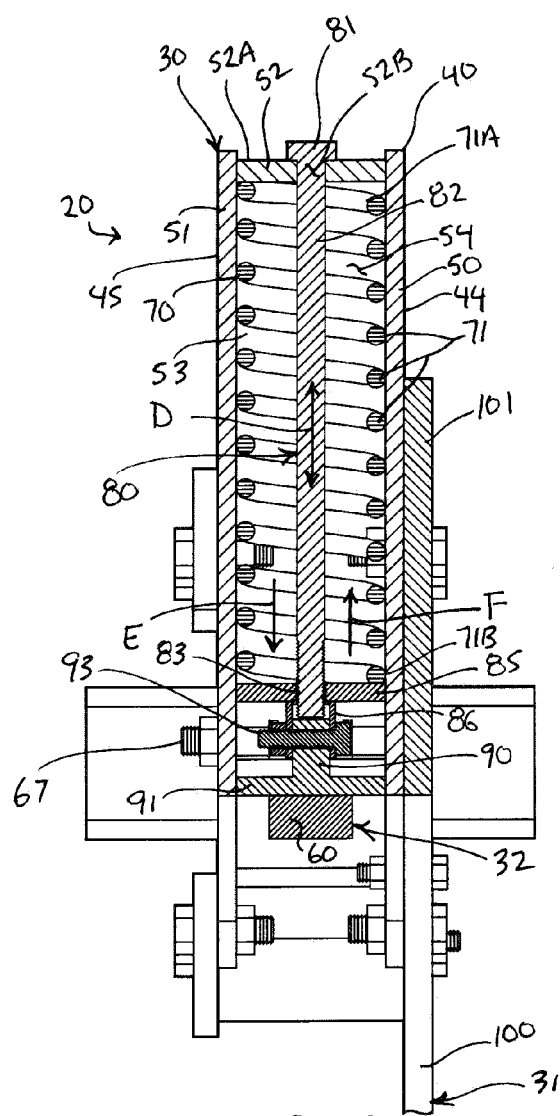
FIG. 10 is a section view taken along line 10-10 of FIG. 5.
Figure 10A:
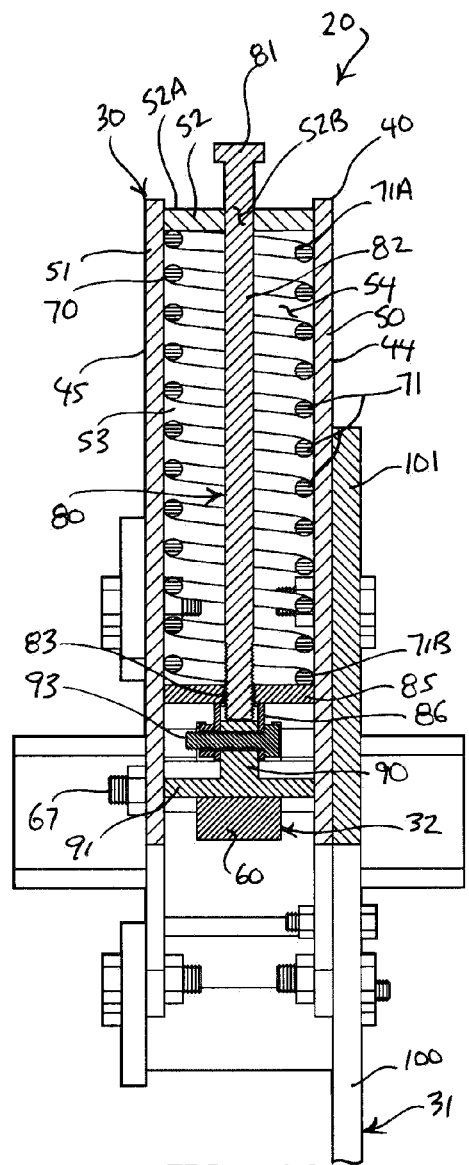
FIG. 10A is a view similar to that of FIG. 10 illustrating a plow spring support assembly as it would appear in a raised position compressing a plow spring coupled between a frame and a plow tool of a plow assembly.

Referencing FIG. 10, an elongate bolt 80 has a bolt head 81 applied to and against the outer or upper surface 52A of top plate 51, and an elongate shaft or shank 82 that extends into chamber 54 through a central opening 52B formed in top plate 52. Shaft 82 of bolt 80 extends vertically downwardly through chamber 54 from upper end 40 of frame 30 toward lower end 41 of frame 30 along rear end 43 of frame 30 to a threaded portion 83 threaded onto a bracket 85 located in chamber 54 between side plates 50 and 51. The underside of bracket 85 is formed with a bifurcation 86 that receives a tongue 90 of an opposing shank bracket 91 located in chamber 54 between side plates 50 and 51, and which is affixed to shank 60, such as by welding. Tongue 90 is pivoted to bifurcation 86 with a nut-and-bolt assembly 93. The assembly consisting of bolt 80 depending downwardly through chamber 54 from top plate 52 to the bracket assembly consisting of pivotally attached brackets 85 and 91 is a plow spring support assembly, which is formed in chamber 54 along rear end 43 of frame 30 between upper and lower ends 40 and 41 of frame 30 and which is free to move in reciprocal directions as generally indicated by double arrowed line D in FIG. 10 between a lowered position as shown in FIG. 10 defining the lowered plowing position of plow tool 32 and a raised position as shown in FIG. 10A defining the elevated clearance position of plow tool 32. Shank 82 is free to reciprocate in opening 52B of top plate 52 and there is sufficient clearance between brackets 85 and 91 and side plates 50 and 51 of frame 30 to permit the reciprocal movement of the plow spring support assembly during tripping of plow tool 32 as discussed below.

Plow spring 70 is positioned in chamber 54 along rear end 43 of frame 30 between upper and lower ends 40 and 41 of frame 30, and encircles shank 82 between top plate 52 and bracket 85. Outermost coil 71A is an uppermost coil of plow spring 70 and is directed against the underside or undersurface of top plate 52, outermost coil 71B is a lower most coil of plow spring 70 and is directed against the upper side or upper surface of bracket 85 opposite to bifurcation 86, and this provides an operative coupling of plow spring 70 between top plate 52 of frame 30 and shank 60 of plow tool 32. Plow spring 70 aggressively acts between top plate 52 of frame 30 and bracket 85 pivoted to shank bracket 91 affixed to shank 60 of plow tool 32 exerting a forcible bias against shank 60 in a downward direction away from upper end 40 of frame 30 in a direction indicated generally be arrowed line E urging plow tool 32 toward the lowered plowing position of tilling head assembly 61 as shown in FIG. 4. Bolt 80 has a length extending from bolt head 81 to threaded portion 83 threaded to bracket 85, and in the lowered plowing position of plow tool 32 bolt head 81 is forced against upper surface 52A of top plate 52, and the length of bolt 80 between bolt head 81 and threaded portion 83 threaded to bracket 85 limits and stops the downward displacement of plow tool 32 defining the lowered plowing position of plow tool 32.

The installation and application of plow spring 70 between frame 30 and shank 60 of plow tool 32 is an automatic plow shank reset feature, whereby spring 70 applies an initial preset force resisting movement of shank 60 upwardly in the direction indicated by arrowed line E in FIG. 10 from the lowered plowing or field working position of plow tool 32. The preset force is generated through a predetermined preload on plow spring 70. Once the preset force is overcome, such as when plow tool 32 encounters a bolder or other rigid object or obstacle, tripping occurs, namely, shank 60 displaces upwardly in the direction indicated by arrowed line F in FIG. 10 to a raised or elevated clearance position, as shown in FIG. 12, to clear the obstruction compressing plow spring 70. When shank 60 displaces upwardly, brackets 91 and 85 are forced upwardly in chamber 54 toward upper end 40 of frame 30 driving bolt 80 upwardly through opening 52B in top plate 52 compressing plow spring 70 in chamber 54 between top plate 52 and bracket 85 as shown in FIG. 10A. After the obstruction is cleared, plow spring 70 decompresses forcing shank 60 downwardly back to the lowered plowing or field working position of plow tool 32 as shown in FIG. 4. The pivotal coupling between bracket 85 and opposed shank bracket 91 permit pivotal displacement therebetween as need during tripping of plow tool 32.

The last main component of plow assembly 32 to be described is runner 31. In the use of ground working apparatus 20, runner 31 supports frame 30 at a fixed elevated location relative to the ground to be plowed by tilling head assembly 61 of plow tool 32. Runner 31 is formed preferably of steel, and is positioned between plow assembly 21 and bridle assembly 22. Runner consists of an elongate, rigid member or support 100 having an upper extremity or end 101 and an opposed lower extremity or end 102 formed with an attached skid 103. Upper end 101 of elongate member 100 is rigidly affixed directly to frame 30 and depends downwardly from frame 30 to lower end 102 formed with skid 103, which is positioned forwardly of plow tool 32 below frame 30, bridle assembly 22 and linkage assembly 24 as shown in FIGS. 4 and 5. As shown in FIGS. 4 and 5, skid 103 is located directly under linkage assembly 24 between bridle assembly 22 and frame 30 ahead of tilling head assembly 61 of plow tool 32.

Figure 6:
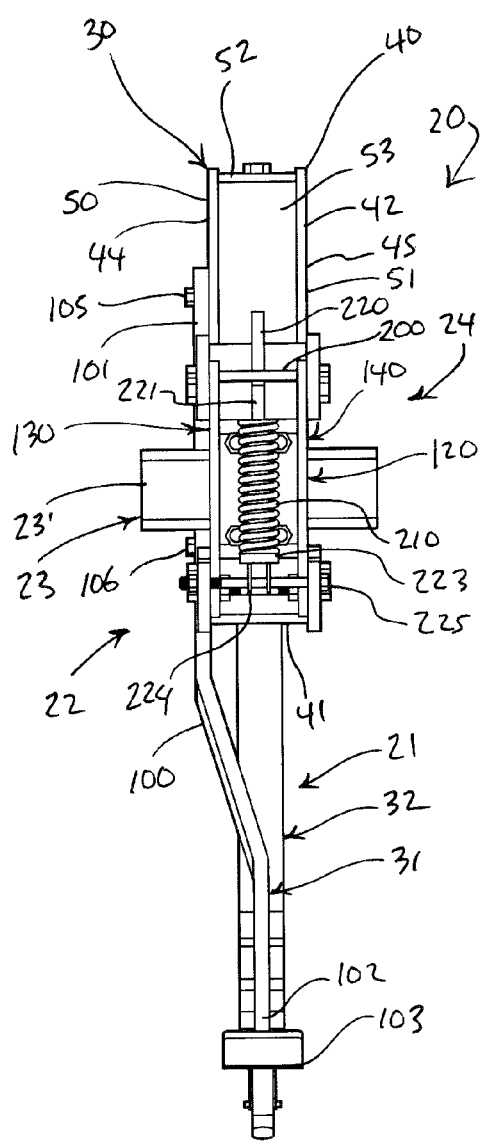
FIG. 6 is a front elevation view of the ground working apparatus of FIG. 1.
Figure 7:
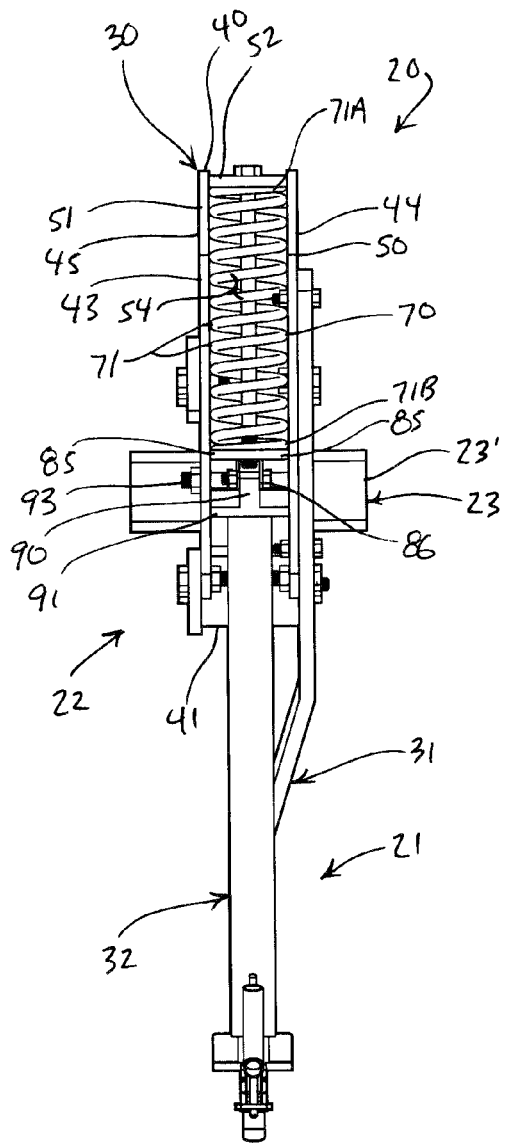
FIG. 7 is a rear elevation view of the ground working apparatus of FIG. 1.

Upper end 101 of elongate support 100 is rigidly affixed to side plate 50 at side 44 of frame 30 proximate to rear end 43 of frame 30 with nut-and-bolt assemblies 105 and 106. Upper end 101 extends downwardly along the outer side of side plate 50 proximate to rear end 43 of frame 30, and elongate support 100 and depends downwardly from lower end 41 end of frame 30 to lower end 102 formed with skid 103. As seen in FIG. 6 elongate support 100 not only depends downwardly from lower end 41 of frame 30, elongate support 100 also angles inwardly under lower end 41 of frame 30 from side 44 of frame 30 to lower end 102 to support and locate skid 103 squarely under lower end 41 of frame 30 along the geometric center of frame 30.

Plow assembly 21 is set upright in use, namely, plow assembly 21 extends upright from tilling head assembly 61 and skid 103 to frame 30, and runner 31 and plow tool 32 depend downwardly from lower end 41 of frame 30 to skid 103 and tilling head assembly 61, respectively to concurrently run over and plow, respectively, ground to be plowed 26 as shown in FIG. 4 along a plowing path B ahead of bridle assembly ground working apparatus 20. Referencing FIG. 5, the lowermost portion of skid 103 of runner 31 resides along skidding or horizontal plane P1, the lowermost portion of tilling head assembly 61 in the lowered plowing position of tilling head assembly 61 resides along plowing or horizontal plane P2 below plate P1, and there is a distance 108 defined between plane P1 of skid 103 of runner 31 and plane P2 of tilling head assembly 61 of plow tool 32. Distance 108 between plane P1 and plane P2 is the maximum plowing depth tilling head assembly 61 extends into ground to be plowed 26 relative to skid 103 running over ground to be plowed 26, as shown in FIG. 4. In the use of plow assembly 21, plow assembly 21 is positioned upright, runner 31 runs over ground to be plowed 26 at skid 103 to maintain frame 30 at its fixed, predetermined height or elevation relative to the ground to be plowed, and in the lowered plowing position of plow tool 32 tilling head assembly 61 extends into ground to be plowed 26 at the depth defined by distance 108 relative to skid 103 running over ground to be plowed 26 to plow into ground to be plowed 26 behind skid 103 to produce a furrow 110 in ground to be plowed 26 behind tilling head assembly 61 as ground working apparatus 20 is drawn along plowing path B. Not only does runner 31 set and support frame 30 at a fixed elevated location relative to the ground to be plowed by tilling head assembly 61 of plow tool 32, it also sets the maximum depth of tilling head assembly 61 extends into ground to be plowed 26 in the lowered plowing position of plow tool 32 at distance 108, in accordance with the principle of the invention.

§C. The Bridle Assembly

Bridle assembly 22 secures plow frame 23 as shown in FIGS. 1 and 2, and linkage assembly 24 couples plow assembly 21 to bridle assembly 22. Referencing FIG. 3, bridle assembly 22 includes a bridle coupling 120, and two U-bolt assemblies including U-bolts 150 and corresponding nuts 151. Bridle coupling 120 includes a bridle coupling 120 preferably formed of steel and which includes a face plate 121, having opposed upper and lower extremities 122 and 123, coupled between and rigidly connecting, preferably by welding, opposed, spaced-apart, parallel bracket plates 130 and 140, which are identical in size and shape. Bracket plates 130 and 140 have upper ends 131 and 141 and opposed lower ends 132 and 142, front ends 133 and 143, and opposed rear ends 134 and 144, and intermediate sockets 135 and 145, respectively. Socket 135 is formed between upper and lower ends 131 and 132 of bracket plate 130, and extends into bracket plate 130 from front end 133 toward rear end 134. Socket 145 is formed between upper and lower ends 141 and 142 of bracket plate 140, and extends into bracket plate 140 from front end 143 toward rear end 144. Sockets 135 and 145 are identical in size and shape and relate to the segment of plow frame 23.

Figure 3:
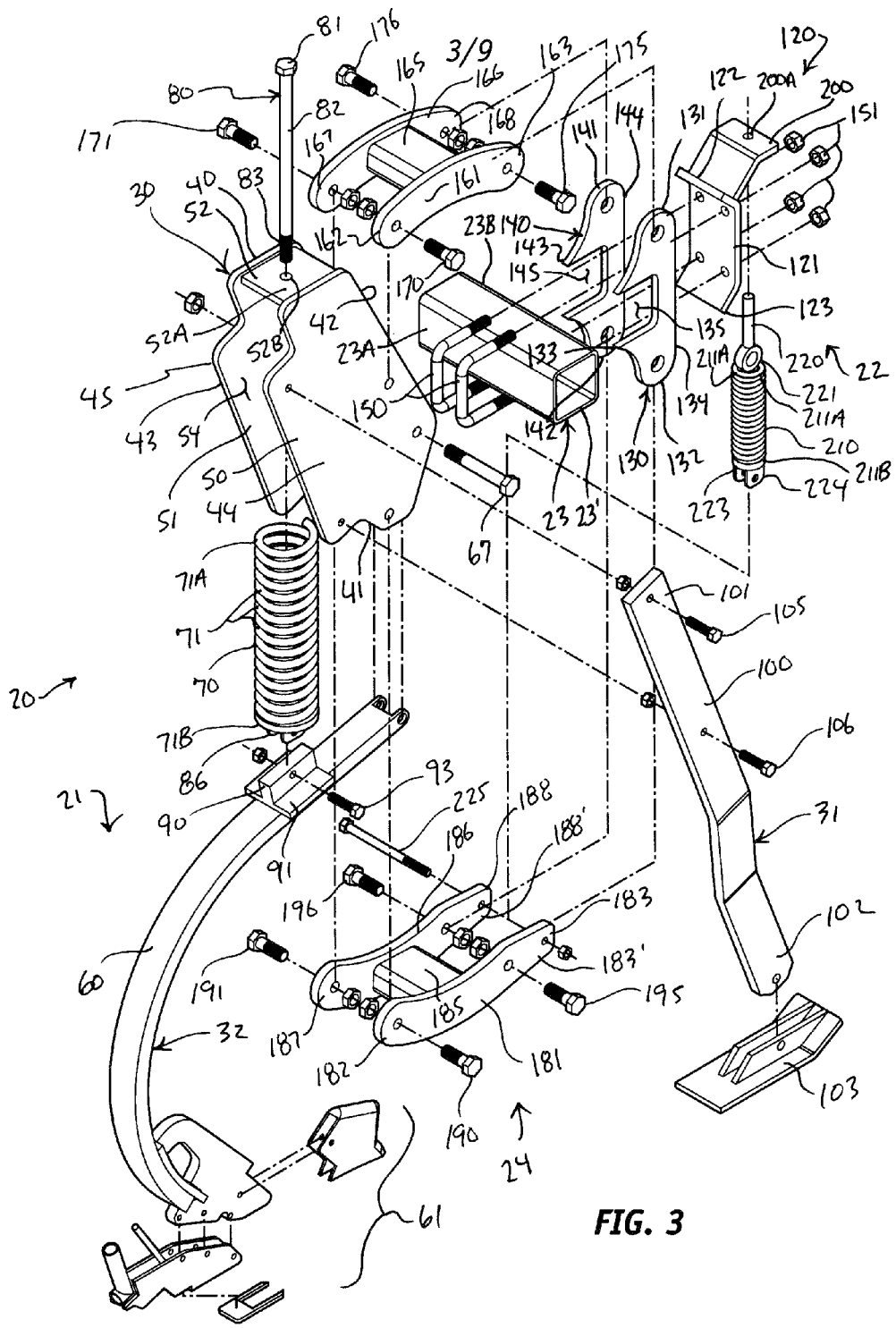
FIG. 3 is an exploded perspective view of the ground working apparatus of FIG. 1.

Segment 23' of plow frame 23 has opposed inner and outer sides 23A and 23B as referenced in FIG. 3. Bridle coupling 120 is positioned along outer side 23B of segment 23' and is applied over segment 23' in a direction toward outer side 23B, in which segment 23' is inserted into and received by sockets 135 and 145 of bridle coupling 120 locating face plate 121 along outer side 23B of the segment of plow frame 23. With bridle coupling 120 so applied to the segment of plow frame 23, face plate 121 extends vertically upward along outer side 23B of segment 23' from lower extremity 123 positioned below segment 23' to upper extremity 12 positioned above segment 23', and bracket plates 130 and 140 straddle segment 23' and, like face plate 121, extend vertically upward along outer side 23B of the segment of plow frame 23 from lower ends 132 and 142, respectively, positioned below segment 23' to upper ends 131 and 141, respectively, positioned above segment 23'. To secure bridle coupling 120 in place, U-bolts 150 are applied over segment 23' in a direction toward outer side 23B between bridle plates 130 and 140 straddling segment 23' and the threaded ends of U-bolts 150 are applied through corresponding openings formed in face plate 121. Nuts 151 are threaded onto the threaded ends of U-bolts 150 and are tightened securing bridle coupling 120 to segment 23' and firmly and securely clamping segment 23' by and between bridle coupling 120 and the U-bolt assemblies. Having applied and secured bridle assembly 22 to segment 23' of plow frame 23, linkage assembly 24 is coupled between plow assembly 21 and bridle assembly 22 coupling plow assembly 21 to bridle assembly 22 as shown in FIGS. 1, 2, 4, 5, 11, and 12.

§D. The Linkage Assembly

Linkage assembly 24 couples plow assembly 21 located rearwardly of or otherwise downstream of inner side 23A of segment 23' to bridle assembly 22 secured to segment 23' of plow frame 23 ahead of plow assembly 21. Segment 23' is located substantially between plow assembly 21 and bridle assembly 22 as shown in the various drawings, particularly FIGS. 4, 5, 11 and 12. Linkage assembly 24 couples frame 30 to bridle assembly 22 to secure a plow frame 23 for movement or displacement of plow assembly 21 in reciprocal directions generally indicated by double arrowed line A in FIGS. 4, 5 and 11 between a lowered position of plow assembly 21 with respect to bridle assembly 22 as shown in FIGS. 4 and 5 and segment 23' of plow frame 23 that bridle assembly 22 secures, and a raised position of plow assembly with respect to bridle assembly 22 as shown in FIG. 11 and segment 23' of plow frame 23 that bridle assembly 22 secures.

Referencing FIG. 3, and referencing in relevant part FIGS. 1, 2, 4, and 5, linkage assembly 24 consists of generally horizontal upper and lower links 160 and 180 pivoted to frame 30 of plow assembly 21 and to bridle coupling 120 of bridle assembly 120. Upper link 160 extends between frame 30 and bridle coupling 120 and is located above segment 23' or otherwise above the upper side of segment 23', and lower link 180 opposes upper link 160 and extends between frame 30 and bridle coupling 120 and is located below segment 23' or otherwise below the lower side of segment 23'. Upper and lower links 160 and 180 are pivoted to frame 30 at frame pivot points, and upper and lower links 160 and 180 are pivoted to bridle coupling 120 of bridle assembly 22 at bridle pivot points. The frame pivot points between upper and lower links 160 and 180 and frame 30 are located on either side of the pivot point between proximal end 64 of shank 60 and frame 30 defined at nut-and-bolt assembly 67, and the bridle pivot points between upper and lower links 160 and 180 and bridle coupling 120 are located at upper ends 131 and 141 and lower ends 132 and 142 of bridle plates 130 and 140. More particularly, the frame pivot point between upper link 160 and frame 30 is located near front end 42 of frame 30 between upper end 40 of frame 30 and the pivot point between proximal end 64 of shank 60 and frame 30 and also somewhat rearwardly of the pivot point between proximal end 64 of shank 60 and frame 30, and the frame pivot point between lower link 180 and frame 30 is located at lower end 41 of frame 30 under and somewhat rearwardly of the pivot point between proximal end 64 of shank 60 and frame 30.

Upper link 160 is an assembly consisting of opposed, parallel, coextensive upper bars or link members 161 and 166 rigidly connected by an intermediate strut 165. Link member 161 has opposed inner and outer ends 162 and 163, and link member 166 has opposed inner and outer ends 167 and 168. Inner end ends 162 and 167 of link members 161 and 166 are applied exteriorly of frame 30 along sides 44 and 45 of frame 30 and are pivoted to side plates 50 and 51 of frame 30 at the frame 30 pivot points with nut-and-bolt assemblies 170 and 171. Link members 161 and 166 project forwardly of the frame pivot points defined by nut-and-bolt assemblies 170 and 171 to outer ends 163 and 168, which are applied along upper ends 131 and 141, respectively, of bracket plates 130 and 140. Outer ends 163 and 168 are pivoted to upper ends 131 and 141, respectively, of bracket plates 130 and 140 with corresponding nut-and-bolt assemblies 175 and 176.

Lower link 180 is, like upper link 160, an assembly consisting of opposed, parallel, coextensive lower bars or link members 181 and 186 rigidly connected by an intermediate strut 185. Link member 181 has opposed inner and outer ends 182 and 183, and link member 186 has opposed inner and outer ends 187 and 188. Inner end ends 182 and 187 of link members 181 and 186 are applied exteriorly of frame 30 along sides 44 and 45 of frame 30 and are pivoted to side plates 50 and 51 of frame 30 at the frame 30 pivot points with nut-and-bolt assemblies 190 and 191. Link members 181 and 186 project forwardly of the frame pivot points defined by nut-and-bolt assemblies 170 and 171 to outer ends 183 and 188, which extend along and past lower ends 132 and 142, respectively, of bracket plates 130 and 140. Link members 181 and 186 are pivoted to lower ends 132 and 142, respectively, of bracket plates 130 and 140 at the bridle pivot points with corresponding nut-and-bolt assemblies 195 and 196. The bridle pivot points defined by nut-and-bolt assemblies 195 and 196 applied between link members 181 and 186 and lower ends 132 and 142 of bracket plates 130 and 140, respectively, are located at a generally intermediate position with respect to inner ends 182 and 183 and outer ends 187 and 188 of link members 181 and 186, respectively, inboard of outer ends 183 and 188, which forms in link members 182 and 186 extensions 183' and 188', respectively, projecting forwardly of not only of the bridle pivot points between link members 181 and 186 and lower ends 132 and 142 of bridle plates 130 and 140 to outer ends 183 and 188 of link members 181 and 186, but also of bridle assembly 22 and plow assembly 21. Extensions 183' and 188' cooperate to form and define an extension of lower link 180.

Accordingly, upper link 160 consists of a pair of opposed, connected, upper bars or link members 161 and 166 pivoted between frame 30 of plow assembly 21 and upper ends 131 and 141 of bridle coupling 120 of bridle assembly 22, and lower link 180 consists of a pair of opposed, connected, lower bars or link members 181 and 186 pivoted between frame 30 of plow assembly 21 and lower ends 132 and 142 of bridle coupling 120 of bridle assembly 22, and this arrangement permits plow frame 21 to move or otherwise displace in reciprocal directions generally indicated by double arrowed line A in FIGS. 4, 5 and 11 between the lowered position of plow assembly 21 with respect to bridle assembly 22 as shown in FIGS. 4 and 5, and the raised position of plow assembly with respect to bridle assembly 22 as shown in FIG. 11. As linkage assembly 24 incorporates opposed pairs of upper and lower bars or link members, linkage 24 is exemplary of four-bar linkage, which is highly reliable and stable.

§E. Load Take-Up Assembly

Plow assembly 21 defines a weight or load, and ground working apparatus 20 incorporates a load take-up assembly coupled between bridle assembly 22 and linkage assembly 24 that applies a bias to linkage assembly 24 urging plow assembly 21 toward its raised position away from its the lowered position partially taking up the load of plow assembly 21. Referencing FIG. 3, this load take-up assembly consists of a bridle spring 210 coupled between bridle coupling 120 of bridle assembly 22 and the extension of lower link 180. Bridle spring 210 acts between bridle coupling 120 and the extension of lower link 180 and applies a bias across linkage assembly 24 urging plow assembly 21 toward its raised position away from its lowered position.

With continuing reference to FIG. 3, and referencing in relevant part FIGS. 1, 2, 4-6, and 8, a bracket plate 200 is affixed to upper extremity 121 of face plate 121, which extends upward and forwardly therefrom away linkage assembly 24 and plow assembly 21. Bracket plate 200 is part of and also an extension of face plate 121, and is spaced above and is located opposite to the extension of lower link 180 formed by extensions 183' and 188' of lower link members 181 and 186. A bridle spring 210 is coupled between bracket plate 200 of bridle coupling 120 and the extension of lower link 180 formed by extensions 183' and 188', and imparts a forcible outward bias between bracket plate 210 and the extension of lower link 180 formed by extensions 183' and 188' pushing or otherwise biasing the extension of lower link 180 downwardly in the direction indicated by arrowed line G in FIGS. 4 and 5. This applied bias to the extension of lower link 180 imparts across linkage assembly 24 a corresponding bias which urges plow assembly 21 toward its raised position away from its the lowered position in the direction indicated by arrowed line H in FIGS. 4 and 5, in accordance with the principle of the invention, taking up a part of the load of plow assembly 21.

Bridle spring 210 is a conventional aggressive tension spring consisting of a wire formed into numerous active coils 211 including two, opposed outermost coils 211A and 211B. Outermost coil 211A is considered an uppermost coil of bridle spring 210, and outermost coil 211B is considered a lowermost coil of bridle spring 210. Bridle spring 210 is fashioned of spring steel, a nickel-based spring alloy, or other material or combination of materials having a substantially constant moduli of elasticity as is typical with tension springs. Bridle spring 210 is smaller and less aggressive compared to plow spring 70.

A central opening 200A (FIG. 3) is formed in bracket plate 200. Opening 200A accepts a pin 220 affixed to a rounded bearing 221, which depends downwardly from bracket plate 200 and which is positioned between bracket plate 200 and the extension of lower link 180. As best illustrated in FIGS. 3 and 8, rounded bearing 221 is applied into outermost coil 210A, and bridle spring 210 extends vertically downwardly therefrom to outermost coil 210B, which is affixed, such as by welding, to a bracket 223 coupled to the extension of lower link 180 formed by extensions 183' and 188'. The underside of bracket 223 is formed with a bifurcation 224 positioned between extensions 183' and 188'. Bifurcation 224 is received about a bolt of nut-and-bolt assembly 225 applied between and secured to extensions 183' and 188'. Nut-and-bolt assembly 225 applied between and secured to extensions 183' and 188' is considered part, of or otherwise an extension of, the extension of lower link 180. Bracket 223 affixed to outermost coil 211B and which is formed with bifurcation 224 received about the bolt of nut-and-bolt assembly 225 applied to and between extensions 183' and 188' cooperate to form a coupling between outermost coil 211B of bridle spring 211 and the extension of lower link 180. Bifurcation 224 is free to pivotally displace about the bolt of nut-and-bolt assembly 225, and rounded bearing 221 and outermost coil 211A are also free to pivotally displace with respect to each other. Bracket plate 200 and rounded bearing 221 carried by pin 220 applied to bracket plate 200 cooperate to form a bracket between bridle coupling 120 of bridle assembly 22 and outermost coil 211A of bridle spring 210, and bridle spring 210 is captured by and between this described bracket and the extension of lower link 180 of link assembly 24.

The installation and application of bridle spring 210 between bridle assembly 22 and the extension of lower link 180 formed by lower link members 181 and 186 is an automatic plow assembly load take-up and plow assembly 21 reset feature, whereby bridle spring 210 applies an initial preset force across linkage assembly 24 at the extension of lower link 180 of linkage assembly 24 urging plow assembly 21 upwardly in the direction indicated by arrowed line H in FIGS. 4 and 5, which, while insufficient to alone displace plow assembly 21, takes up a portion of the load of plow assembly 21, such as approximately 30 percent of the load of plow assembly 21. The preset force is generated through a predetermined preload on bridle spring 210. As a matter of example, when skid 103 of runner 31 encounters an obstacle, such as a rock or other obstacle on the ground over which skid 103 of runner 31 is being drawn in the use of ground working apparatus 20, the preset load of bridle spring 210 applying the described bias to plow assembly 21 allows plow assembly 21 to more easily displace upwardly in the direction indicated by arrowed line H in FIGS. 4 and 5 in response to skid 103 of runner 31 encountering an obstacle. When plow assembly 21 displaces upwardly, the extension of lower link 180 pivotally moves away from rounded bearing 221 increasing the distance between the extension of lower link 180 and rounded bearing 221 decompressing bridle spring 210 therebetween releasing the tension applied across bridle spring 210. After the obstruction is cleared, plow assembly 21 displaces downwardly toward the ground to be plowed until skid 103 encounters the surface of the ground to be plowed resetting frame 30 of plow assembly 21 at is fixed elevated location above and relative to the ground to be plowed. When plow assembly 21 displaces downwardly, the extension of lower link 180 pivotally moves toward rounded bearing 221 decreasing the distance between the extension of lower link 180 and rounded bearing 221 compressing bridle spring 210 therebetween increasing the tension applied across bridle spring 210 dampening the movement of plow assembly 21 from its raised position back to its lowered position preventing plow assembly 21 from slamming against the ground to be plowed, which could otherwise damage plow assembly 21 or compromise the linkage between plow assembly 21 and bridle assembly 22. The pivotal coupling between outermost coil 211A and rounded bearing 221 and the pivotal coupling between bracket 223 and nut-and-bolt assembly 225 coupled to extensions 183' and 188', which forms part of the extension of lower link 180, permits any required pivotal displacement between bridle spring 210 and bridle assembly 22 during the compression and decompression of bridle spring 210 in response to the upward and downward displacement of plow assembly 21 relative to bridle assembly 22 and the ground to be plowed.

§F. Operation of the Ground Working Apparatus

In operation, bridle assembly 22 is secured to segment 23' of plow frame, plow assembly 21 is positioned rearwardly of segment 23' of plow frame 23, and linkage assembly 24 is formed between plow assembly 21 and bridle assembly 22 and pivotally couples frame 30 and bridle coupling 120 of bridle assembly 22. Plow assembly 21 is positioned upright behind segment 23' of plow frame 23. Runner 31 and plow tool 32 depend downwardly from frame 30 to concurrently run over and plow, respectively, ground to be plowed 26 as illustrated in FIG. 4 as ground working apparatus 20 is moved along plowing path B ahead of ground working apparatus 20. Runner 31 depends downwardly from frame 30 to skid 103 that runs over ground to be plowed 26, and plow tool 32 depends downwardly from frame 30 to plow ground to be plowed 26. Skid 103 of runner 31 positioned between plow assembly 21 and bridle assembly 22 runs over ground to be plowed 26, such that runner 31 thereby sets frame 30 of plow assembly 21 at a fixed elevated position with respect to ground to be plowed 26 as ground working apparatus 20 is moved and applied along plowing path B denoted in FIG. 4 in a direction leading with bridle assembly 22 and trailing with plow assembly 21. The application of runner 31 between frame 30 and ground to be plowed sets frame 30 at a fixed elevated height or location above ground to be plowed 26, and also sets the plowing depth of plow tool 32 in ground to be plowed at distance or depth 108 as measured between plane P1 of skid 103 running along the surface of ground to be plowed and plane P2 of tilling head assembly 61 of plow tool 32 extending into ground to be plowed 26, in accordance with the principle of the invention.

Plow tool 32 is, of course, mounted to frame 30 for movement in reciprocal directions as generally indicated by the double arrowed line C in FIGS. 4 and 12 between the lowered plowing position of tilling head assembly 61 as shown in FIG. 4 to extend into and plow ground to be plowed 26, and the elevated clearance position of tilling head assembly 61 as shown in FIG. 12 to clear an impacting obstacle. Plow spring 70 applied between frame 30 and shank 60 of plow tool 32 acts therebetween and biases or otherwise urges plow tool 32 into the lowered plowing position of tilling head assembly 61. The installation and application of plow spring 70 between frame 30 and shank 60 of plow tool 32 is an automatic plow shank reset feature as described. Namely, plow spring 70 applies an initial preset force resisting movement of shank 60 upwardly in the direction indicated by arrowed line E in FIG. 10 from the lowered plowing or field working position of plow tool 32 to maintain tilling head assembly 61 in the lowered plowing or field working position. When the preset force is overcome, such as when plow tool 32 encounters an obstacle, such as when tilling head assembly 61 encounters a rock, boulder, or other obstacle in ground to be plowed 26, tripping occurs, whereby shank 60 displaces upwardly in the direction indicated by arrowed line F in FIG. 10 to a raised or elevated clearance position, as shown in FIG. 12, to allow plow tool 32 to clear the obstruction. After the obstruction is cleared, plow spring 70 forces forcing plow tool 32 downwardly at shank 60 back to the lowered plowing or field working position of plow tool 32 as shown in FIG. 4. It is to be emphasized that the length of bolt 80 between bolt head 81 applied to top plate 52 of frame and threaded portion 83 threaded to bracket 85 limits and stops the downward displacement of plow tool 32 and defines the lowered plowing position of plow tool 32, namely, the lowered plowing or field working position of tilling head assembly 61 of plow tool 32.

Linkage assembly 24 couples frame 30 to bridle assembly 22 for movement or displacement of plow assembly 21 in reciprocal directions generally indicated by double arrowed line A in FIGS. 4, 5 and 11 between a lowered position of plow assembly 21 with respect to bridle assembly 22 as shown in FIGS. 4 and 5, and a raised position of plow assembly with respect to bridle assembly 22 as shown in FIG. 11. As ground working apparatus 20 is drawing along the plowing path B, linkage assembly 24 permits plow assembly 21 to reciprocate and displace between its raised and lowered positions relative to bridle assembly 22 and segment 23' of plow frame 23 to ensure plow assembly 21 remains operational as it is drawn along plowing path B, namely, to ensure runner 31 and plow assembly 32 concurrently run over and plow, respectively, ground to be plowed 26 as shown in FIG. 4.

The installation and application of bridle spring 210 between bridle assembly 22 and the extension of lower link 180 formed by lower link members 181 and 186 is an automatic plow assembly load take-up and plow assembly 21 reset feature as described, in which bridle spring 210 acts between bridle assembly 22 and the extension of lower link 180 applying a bias across linkage assembly 24 at the extension of lower link 180 of linkage assembly 24 urging plow assembly 21 upwardly in the direction indicated by arrowed line H in FIGS. 4 and 5, which is insufficient to displace plow assembly 21 but takes up a portion of the load of plow assembly 21. And so when skid 103 of runner 31 encounters an obstacle, such as a rock or other obstacle on the ground over which skid 103 of runner 31 is being drawn in the use of ground working apparatus 20, the preset load of bridle spring 210 applying the described bias to plow assembly 21 allows plow assembly 21 to readily displace upwardly in the direction indicated by arrowed line H in FIGS. 4 and 5 in response to skid 103 of runner 31 encountering an obstacle. After an obstruction is cleared, plow assembly 21 is free to displace downwardly toward the ground to be plowed until skid 103 encounters the surface of the ground to be plowed resetting frame 30 of plow assembly 21 at is fixed elevated location above and relative to the ground to be plowed. Because bridle spring 210 is insufficient to displace plow assembly 21 and takes up only a portion of the load of plow assembly 21, when an obstacle is cleared, bridle spring 210 does not restrict plow assembly 21 from moving back to its lowered plowing position, but rather dampens the downwardly movement of plow assembly 21 causing plow assembly 21 to gently descend from its raised position and back to its lowered position to allow runner 31 and plow assembly 32 concurrently run over and plow, respectively, ground to be plowed 26 as shown in FIG. 4. This dampening of plow assembly 21 through the application of bridle spring 210 dampens movement of plow assembly 21 from its raised position back to its lowered position preventing plow assembly from slamming against the ground to be plowed, which could otherwise damage plow assembly 21 or compromise the linkage between plow assembly 21 and bridle assembly 22.

The present invention is described above with reference to a preferred embodiment. However, those skilled in the art will recognize that changes and modifications may be made in the described embodiment without departing from the nature and scope of the present invention. For instance, in the preferred embodiment of ground working apparatus 20 plow spring 70 is a compression spring, which acts between and against frame 30 and shank 60 urging plow tool 32 toward the lowered plowing position of tilling head assembly 61. Also, bridle spring 210 is a compression spring, which acts between bridle coupling 120 and the extension of lower link 180 and applies a bias across linkage assembly 24 urging plow assembly 21 toward its raised position away from its lowered position. The compression springs forming the preferred embodiments if plow spring 70 and bridle spring 210 can, in alternate embodiments, each include a plurality of compression springs, one or more inflated bladders, or other instrument, apparatus, or device suitable to impart the applied biases. Furthermore, runner 31 runs over ground to be plowed 26 at skid 103 to maintain frame 30 at its fixed position. In a further embodiment, skid 103 can incorporate or be replaced with one or more wheels to provided wheel movement of runner 31 over the ground to be plowed.

Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A ground working apparatus, comprising:
    a bridle assembly to secure a plow frame;
    a plow assembly defines a load and comprises a frame, and a runner and a plow tool each coupled to the frame;
    a linkage assembly coupling the frame to the bridle assembly to secure the plow frame for movement of the plow assembly between a raised position and lowered ground-working position relative to the bridle assembly;
    the runner and the plow tool depending downwardly from the frame to concurrently run over and plow, respectively, ground to be plowed along a plowing path ahead of the bridle assembly and the plow assembly, and the runner to run over the ground to be plowed to set the frame of the plow assembly at a fixed elevated position with respect to the ground to be plowed; and
    a load take-up assembly coupled between the bridle assembly and the linkage assembly, in the lowered ground-working position of the plow assembly the load take-up assembly applies a bias to the linkage assembly that takes up a portion of the load of the plow assembly, which, while insufficient to alone displace the plow assembly from the lowered ground-working position to the raised position relative to the bridle assembly, urges the plow assembly toward the raised position away from the lowered ground-working position relative to the bridle assembly to assist the plow assembly in displacing upwardly into the raised position from the lowered ground-working position relative to the bridle assembly in response to the runner encountering an obstacle.

2. A ground working apparatus according to claim 1, further comprising:
    the plow tool mounted to the frame for movement between a lowered plowing position and an elevated clearance position; and
    means coupled between the frame and the plow tool urging the plow tool in a direction toward the lowered plowing position.

3. A ground working apparatus according to claim 1, wherein the load take-up assembly comprises a compression spring coupled between the bridle assembly and the linkage assembly.

4. A ground working apparatus according to claim 2, wherein the means comprises a compression spring coupled between the frame and the plow tool.

5. A ground working apparatus according to claim 1, wherein the runner is positioned between the plow tool and the bridle assembly.

6. A ground working apparatus according to claim 5, wherein:
    the plow tool comprises an elongate shank coupled to the frame and which depends downwardly therefrom to an attached tilling head assembly to extend into and plow the ground to be plowed in the lowered plowing position of the plow tool; and
    the runner comprises an elongate, rigid support having an upper end rigidly coupled to the frame and which depends downwardly therefrom to an opposed lower end formed with a ground-engaging skid set forwardly of and above the tilling head assembly to support the frame at an elevated position relative to the ground to be plowed by the tilling head assembly.

7. A ground working apparatus according to claim 1, wherein the linkage assembly comprises a four-bar linkage pivotally coupled between the frame and the bridle assembly.

8. A ground working apparatus, comprising:
    a bridle assembly to secure a plow frame;
    a plow assembly defines a load and comprises a frame, and a runner and a plow tool each coupled to the frame;
    a linkage assembly pivotally coupled between the frame and the bridle assembly permitting movement of the plow assembly between a raised position and lowered ground-working position relative to the bridle assembly;
    the runner and the plow tool depending downwardly from the frame to concurrently run over and plow, respectively, ground to be plowed along a plowing path ahead of the bridle assembly and the plow assembly, and the runner to run over the ground to be plowed to set the frame of the plow assembly at a fixed elevated position with respect to the ground to be plowed;
    the linkage assembly comprises generally horizontal upper and lower links pivoted to the frame and the bridle at frame and bridle pivot points, respectively;
    an extension of the lower link extends forwardly of the bridle pivot point of the lower link away from the plow assembly; and first means coupled between the bridle assembly and the extension of the lower link applying a bias to the linkage assembly in the lowered ground-working position of the plow assembly taking up a portion of the load of the plow assembly, which, while insufficient to alone displace the plow assembly from the lowered ground-working position to the raised position relative to the bridle assembly, urges the plow assembly toward the raised position away from the lowered ground-working position relative to the bridle assembly to assist the plow assembly in displacing upwardly into the raised position from the lowered ground-working position relative to the bridle assembly in response to the runner encountering an obstacle.

9. A ground working apparatus according to claim 8, further comprising:
the plow tool mounted to the frame for movement between a lowered plowing position and an elevated clearance position; and
second means coupled between the frame and the plow tool urging the plow tool in a direction toward the lowered plowing position.

10. A ground working apparatus according to claim 9, wherein the first means comprises a first compression spring coupled between the bridle assembly and the extension of the lower link.

11. A ground working apparatus according to claim 10, wherein the first compression spring has an upper end pivoted to the bridle assembly, and an opposed lower end pivoted to the extension of the lower link.

12. A ground working apparatus according to claim 11, wherein the second means comprises a second compression spring coupled between the frame and the plow tool.

13. A ground working apparatus according to claim 9, wherein the runner is positioned between the plow tool and the bridle assembly.

14. A ground working apparatus according to claim 13, wherein:
the plow tool comprises an elongate shank coupled to the frame and which depends downwardly therefrom to an attached tilling head assembly to extend into and plow the ground to be plowed in the lowered plowing position of the plow tool; and
the runner comprises an elongate, rigid support having an upper end rigidly coupled to the frame and which depends downwardly therefrom to an opposed lower end formed with a ground-engaging skid set forwardly of and above the tilling head assembly to support the frame at an elevated position relative to the ground to be plowed by the tilling head assembly.

15. A ground working apparatus, comprising:
a bridle assembly to secure a plow frame;
a plow assembly defines a load and comprises a frame, and a runner and a plow tool each coupled to the frame;
a linkage assembly pivotally coupled between the frame and the bridle assembly permitting the plow assembly to displace between a raised position and lowered ground-working position relative to the bridle assembly;
the runner and the plow tool depending downwardly from the frame to concurrently run over and plow, respectively, ground to be plowed along a plowing path ahead of the bridle assembly and the plow assembly, and the runner to run over the ground to be plowed to set the frame of the plow assembly at a fixed elevated position with respect to the ground to be plowed;
the linkage assembly comprises generally horizontal upper and lower links pivoted to the frame and the bridle at frame and bridle pivot points, respectively;
an extension of the lower link extending forwardly of the bridle pivot point of the lower link away from the plow assembly;
a bracket affixed to the bridle assembly near the bridle pivot point of the upper link; and
a bridle spring coupled between the bracket and the extension of the lower link applying a bias to the linkage assembly at the extension of the lower link in the lowered ground-working position of the plow assembly that takes up a portion of the load of the plow assembly, which, while insufficient to alone displace the plow assembly from the lowered ground-working position to the raised position relative to the bridle assembly, urges the plow assembly toward the raised position away from the lowered ground-working position and the ground to be plowed relative to the bridle assembly to assist the plow assembly in displacing upwardly into the raised position from the lowered ground-working position relative to the bridle assembly in response to the runner encountering an obstacle.

16. A ground working apparatus according to claim 15, wherein the bridle spring has an upper end pivoted to the bracket, and an opposed lower end pivoted to the extension of the lower link.

17. A ground working apparatus according to claim 15, wherein the runner is positioned between the plow tool and the bridle assembly.

18. A ground working apparatus according to claim 17, wherein:
the plow tool comprises an elongate shank coupled to the frame and which depends downwardly therefrom to an attached tilling head assembly to extend into and plow the ground to be plowed; and
the runner comprises an elongate, rigid support having an upper end rigidly coupled to the frame and which depends downwardly therefrom to an opposed lower end formed with a ground-engaging skid set forwardly of and above the tilling head assembly to support the frame at an elevated position relative to the ground to be plowed by the tilling head assembly.

19. A ground working apparatus according to claim 18, further comprising:
the shank mounted to the frame for movement between a lowered plowing position of the tilling head assembly to plow the ground to be plowed and an elevated clearance position of the tilling head assembly; and
a plow spring coupled between the frame and the shank urging the plow tool in a direction toward the lowered plowing position of the tilling head assembly.

* * * * *